United States Patent
Ramamurthy et al.

(10) Patent No.: US 11,429,433 B2
(45) Date of Patent: Aug. 30, 2022

(54) PROCESS DISCOVERY AND AUTOMATIC ROBOTIC SCRIPTS GENERATION FOR DISTRIBUTED COMPUTING RESOURCES

(71) Applicant: EPIANCE SOFTWARE PVT. LTD., Karnataka (IN)

(72) Inventors: Ravi Ramamurthy, Bangalore (IN); Ramgopal M. Cillanki, Bangalore (IN); Satyanarayana V. V. Kondamuri, Bangalore (IN)

(73) Assignee: EPIANCE SOFTWARE PVT. LTD., Bangalore (IN)

( * ) Notice: Subject to any disclaimer, the term of this patent is extended or adjusted under 35 U.S.C. 154(b) by 185 days.

(21) Appl. No.: 16/430,460

(22) Filed: Jun. 4, 2019

(65) Prior Publication Data
US 2020/0233707 A1 Jul. 23, 2020

(30) Foreign Application Priority Data

Jan. 16, 2019 (IN) .............................. 201941001939

(51) Int. Cl.
*G06F 9/48* (2006.01)
*G06F 8/70* (2018.01)
*G06F 9/451* (2018.01)
*G06F 9/50* (2006.01)

(52) U.S. Cl.
CPC .............. *G06F 9/4881* (2013.01); *G06F 8/70* (2013.01); *G06F 9/451* (2018.02); *G06F 9/5027* (2013.01)

(58) Field of Classification Search
CPC .......... G06F 9/4881; G06F 8/70; G06F 9/451; G06F 9/5027; G06F 2209/5017
See application file for complete search history.

(56) References Cited

U.S. PATENT DOCUMENTS

| | | | |
|---|---|---|---|
| 2008/0040725 A1* | 2/2008 | Moss | G06F 9/5038 718/106 |
| 2018/0113781 A1* | 4/2018 | Kim | G06F 11/3438 |
| 2018/0322396 A1* | 11/2018 | Ahuja-Cogny | G06N 5/02 |
| 2019/0066018 A1* | 2/2019 | Sethi | G06Q 10/0633 |
| 2020/0206920 A1* | 7/2020 | Ma | G06K 9/6223 |

* cited by examiner

*Primary Examiner* — Benjamin C Wu
(74) *Attorney, Agent, or Firm* — Prakash Nama; Global IP Services, PLLC

(57) ABSTRACT

Techniques for process discovery and automatic generation of robotic scripts for distributed computing resources are disclosed. In one embodiment, at least one automatable process step associated with an activity performed while interacting with at least one application may be determined. The at least one automatable process step may be segregated into multiple tasks based on parallel executable tasks and sequentially executable tasks. Different types of distributed computing resources may be determined to execute the multiple tasks based on the segregation. A modified process flow corresponding to the at least one automatable process step may be automatically generated based on the segregated multiple tasks and the different types of the distributed computing resources. Further, a robotic script based on the modified flow of the at least one automatable process step may be automatically generated. The robotic script may be executed to perform the activity.

22 Claims, 9 Drawing Sheets

PROCESS DISCOVERY AND AUTOMATIC ROBOTIC SCRIPTS GENERATION FOR DISTRIBUTED COMPUTING RESOURCES

RELATED APPLICATIONS

Benefit is claimed under 35 U.S.C. 119(a)-(d) to Foreign Application Serial No. 201941001939 filed in India entitled "PROCESS DISCOVERY AND AUTOMATIC ROBOTIC SCRIPTS GENERATION FOR DISTRIBUTED COMPUTING RESOURCES", on Jan. 16, 2019, by EPIANCE SOFTWARE PVT. LTD., which is herein incorporated in its entirety by reference for all purposes

TECHNICAL FIELD

The present disclosure relates to process science and process automation, and more particularly to methods, techniques, and systems for process discovery and automatic robotic scripts generation for distributed computing resources.

BACKGROUND

Users of computing systems usually work on multiple applications to perform different processes. Some of these processes may be monotonous, repetitive, and mechanical in nature, which may result in users spending considerable time and effort, which adversely affects work productivity. In order to aid users, process automation may be required. Since such processes may require learning, robotic process automation (RPA) can be a preferred mode of automation. Robotic process automation may allow automation of industrial and clerical processes using software robots. Thus, organizations may use the software robots to perform routine processes by mimicking the ways in which users interact with the applications.

For example, software robots may automate input sources and interaction with the applications, which may result in reduction of time taken to perform the processes. However, partial automation may be possible in a bulk of processes. Also, a percentage of automation may decrease further in the case of voice-based transactions. In a voice-based transaction, the software robots may reduce the time spent with the application. Even though the time spent may be reduced by the software robots, the user may have to wait in between the transaction while a software robot performs a part of the process. In addition, with the bulk of applications (e.g., virtual environments, legacy applications, and the like), the limitations of an application framework may not allow the software robots to work in background processing. In such scenarios, the benefit of the software robots may be insignificant as the upfront cost of development and cost of maintenance may not justify deployment of the software robots.

Figure 1:
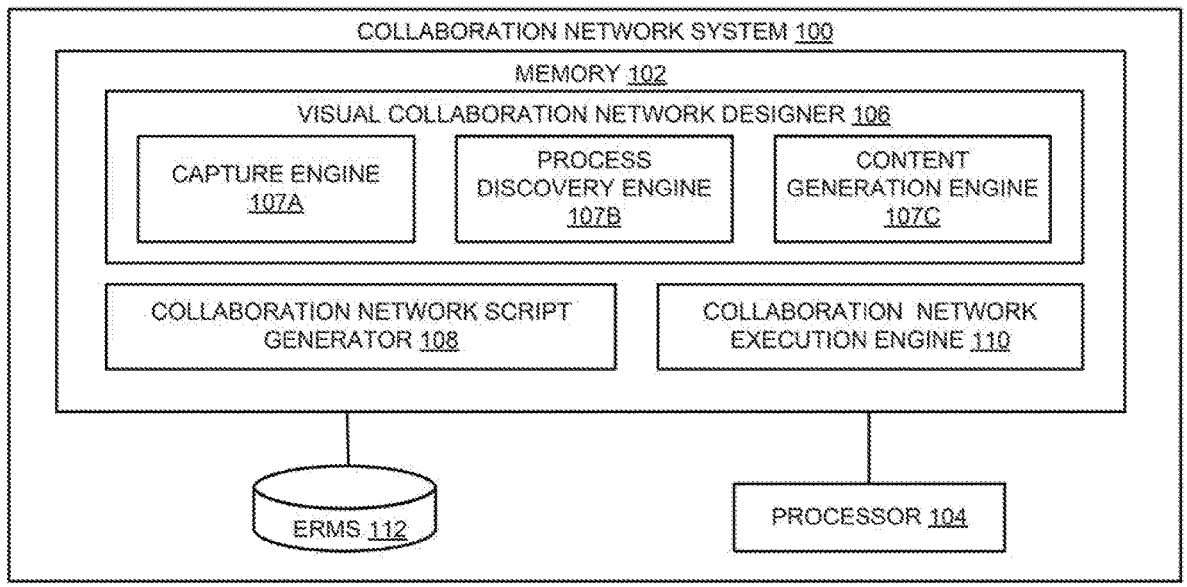
FIG. 1 is a block diagram of an example collaboration network system illustrating automatic robotic scripts generation for distributed computing resources.

The drawings described herein are for illustration purposes only and are not intended to limit the scope of the present subject matter in any way.

DETAILED DESCRIPTION

Embodiments described herein may provide an enhanced computer-based and network-based method, technique, and system for process discovery and automatic generation of robotic scripts for distributed computing resources. The robotic scripts may be generated to capture and interpret applications for processing a transaction, manipulating data, triggering responses, communicating with other digital systems, or the like using robotic process automation technology. Robotic process automation may automate processes in a process flow (e.g., at graphical user interface layer) without any changes to the underlying applications. The process flow or an activity may include multiple process steps or processes associated with multiple applications. The 'robotic scripts' may also be referred as 'software robots', 'bots', or 'virtual robots', which may be aimed at automating processes.

The robotic scripts may automate process steps such as, but are not limited to launching applications, checking emails, moving or backing up files, and keystroke recordings. Further, the robotic scripts may be capable of simulating or mimicking user interactions. User interactions may refer to a human interface device (e.g., a mouse, keyboard, trackpad and so on) actions performed by the user or a robot. The actions can be mouse actions, keyboard actions, replicate cut, copy, and paste features from one template to another, create scheduled tasks, undo and redo operations and other computer tasks. In addition, automation may not be restricted to the graphical user interface layer or mimicking end user. For example, application programming interface (API) integration, Web service integration, screen scraping, file and database integration, document processing, user interface consolidation and collation from unlinked applications, cognitive technologies and other new age artificial intelligence technologies can be automated by utilizing robotic scripts. Example applications may include SAP® applications, PeopleSoft® applications, SalesForce® applications, web-based software applications, and the like.

In business process outsourcing (BPOS) and shared services, processes may be voice-based, back office transactions, or a combination thereof. In a pure play voice-based transaction, the users, agents, or advisors may respond to a caller based on data provided to the agent by an organization. Further, a pure play back office transaction may involve no contact with a customer. In the realm of voice-based processes, few processes may be pure play and a significant number of the processes may involve interactions with an application that supports the agent in making decisions or may help the agents in pulling up the data required to respond to a call. The amount of interaction time with the application may vary depending on the process. However, there may be a sizable number of processes, where the application interaction duration can form a good percentage of the overall process time.

An agent may complete the process and then takes on the next transaction which is in the queue. With the advent of automation, parts of the input source may be automated. For example, interactive voice response (IVR) systems and voice recognition systems may attempt to decode the intent of the user and the information required from the voice call. Machine learning systems may try to do the same from other input sources such as unstructured mails, portable document format (PDF) documents, Word documents, and the like. Further, Optical character recognition (OCR) technology may automate recognition of the text from a facsimile (FAX) or a scanned PDF document.

For example, consider the total time taken to perform the activity or a transaction without robotic process automation is as shown in equation 1. T1 may be time taken to retrieve information from the input source, T2 may be time taken by the application to process the information, and T3 may be time taken by the agent to obtain output from the application and provide to the customer. Further, the total time taken to perform the transaction using robotic process automation is shown in equation 2. If T1 is 1 minute, T2 is 2 minutes, and T3 is 1 minute, the total reduction or savings in time is 0.2 minute or 5%. In such a scenario, upfront cost of development and cost of maintenance may not justify deployment of bots.

$$\text{Time taken to perform the transaction} = T1 + T2 + T3 \quad (1)$$

$$\text{Time per transaction using RPA} = T1 + 0.90T2 + T3 \text{ (assuming 10\% savings)} \quad (2)$$

Examples described herein may design the process flow in a business process with an intent of efficiency and optimal usage of available resources based on factors influencing the process flow. The factors that influence the process flow may be, but are not limited to, an extent of automation, nature of user involvement, an extent of user involvement, phases of user involvement, a number of users involved in every transaction, the process steps that are inter-dependent, the process steps that are independent, the process steps that are to be performed in sequence, the process steps that can be performed in any sequence, and availability of computing resources.

Examples described herein may determine at least one automatable process step associated with an activity performed while interacting with at least one application, segregate the at least one automatable process step into multiple tasks based on parallel executable tasks and sequentially executable tasks, determine different types of distributed computing resources to execute the multiple tasks based on the segregation, automatically generate a modified process flow corresponding to the at least one automatable process step based on the segregated multiple tasks and the different types of the distributed computing resources, automatically generate a robotic script based on the modified flow of the at least one automatable process step, and execute the robotic script to perform the activity.

System Overview and Examples of Operation

FIG. 1 is a block diagram of an example collaboration network system 100 illustrating automatic robotic scripts generation for distributed computing resources. Collaboration network system 100 may be a computing system including a memory 102 and a processor 104 to execute instructions stored in memory 102. For example, processor 104 may be in electronic communication with memory 102 (e.g., a non-transitory computer-readable storage medium) through a high-speed memory bus. Further, the code may be configured to reference data stored in a database of the non-transitory computer-readable storage medium, for example, as may be present locally or in a remote database.

In one example, memory 102 may include a visual collaboration network designer 106, a collaboration network script generator 108, and a collaboration network execution engine 110. Further, collaboration network system 100 may include a repository (e.g., an enterprise repository management system (ERMS) 112) that is communicatively connected to memory 102. In one example, ERMS 112 may reside in collaboration network system 100 or may reside in another computing system.

In one example, visual collaboration network designer 106 may include a capture engine 107A, a process discovery engine 107B, and a content generation engine 107C. Capture engine 107A may intercept user interactions with an application. Further, capture engine 107A may generate a process script which includes information such as application name, screen/dialog, control name, control type, control region, control value, control state, event performed, event timestamp, performing user, user machine, and/or the like. Example capture engine 107A may be deployed on a large pool of user machines and may run for a significant duration (e.g., few days to a few weeks). For example, capture engine 107A may be run for the purpose of performance monitoring. Further, the captured data at regular intervals may be uploaded to a repository for further analysis.

In one example, process discovery engine 107B may parse through the captured data (e.g., either the entire repository or a subset of the repository) and may generate an event graph with user actions and transitions. Further, process discovery engine 107B may generate details of necessary validations at a field level, group of fields level, screen/window/page/url level, application or group of applications levels and/or at a process level. The validations can be prior to the process action/step being performed in which case it may be considered as an entry criteria or pre-requisite for performing the process or action. The validations can be post/after the process action/step performed, in which case, it may be considered an exit criteria. In one example, process discovery engine 107B may generate a field validation for a 'Date of Birth' field by looking at a large volume of steps performed on the 'Date of Birth' field in the captured processes. The validation may consist of the type of data (Date), the valid values or range, the structure of valid data and/or invalid data identifying rules. Further, process discovery engine 107B may generate details of probable exceptions at a field level, group of fields level, screen/window/page/url level, application or group of applications levels and/or at a process level. Furthermore, the automatically identified or marked exceptions and validations may have the process steps that were performed prior to encountering the exceptions which are then associated as the context of the exception/validation for the process. Also, one or more actions post the exception can be automatically identified or marked as a resolution to the exception. Further, process discovery engine 107B may perform necessary filtering to discard noise and unwanted events before constructing the event graph. In one example, process discovery engine 107B may perform certain optimization and run event manipulation algorithms. With the generated event graph, it may be possible to get possible paths from start to end of the graph, metrics for each path in terms of number of occurrences of the path, time duration, number of steps, branch points with reason for branching, and the like. For example, process discovery engine 107B may generate micro and macro metrics. Example micro metrics may be turn-around time (TAT) of a user, error rate, and the like. In one example, generated workflow can either be used for other purposes such as documentation, content creation, robot creation, and the like. Further, it may also be possible to modify the workflow with the intent of re-engineering the process (e.g., process improvement). Process discovery engine 107B may then re-calculate the metrics for the modified workflow. Hence, process discovery engine 107B may help in simulating a to-be process before the actual changes are implemented.

Further, content generation engine 107C may generate process documents, process simulations and other types of content for the workflow generated by the process discovery engine 107B. Further, the validations and exceptions are used in the generated process document, training, simulations, content, bot, performance support, issue reporting, automated issue resolution, and the like by content generation engine 107C. Further, the exceptions, the steps prior to the exception, and the resolutions steps post the exception may be used to automatically provide production support (e.g., issue reporting) whenever a user encounters the same issue either in a live production environment, simulated training environment or a combination thereof. The resolutions are also documented, and related content generated for users to be trained by content generation engine 107C. The same resolutions can also be automatically used by Bots on encountering the exceptions at the time of automation by collaboration network script generator 108 and collaboration network execution engine 110.

Thus, during design time, visual collaboration network designer 106 may receive a plurality of process steps associated with the process or an activity performed while interacting with at least one application. The activity may include a process flow having a set of related and structured process steps. For example, the process steps may correspond to multiple sequences of graphical user interface interactions carried out while performing the activity. In one example, the process steps associated with the activity may be obtained by observing a user performing the process steps while executing applications. In another example, the user may define or provide the process steps for performing the activity manually. Upon receiving the process steps, visual collaboration network designer 106 may determine at least one automatable process step associated with the activity. In one example, visual collaboration network designer 106 may determine the automatable process steps and manual process steps associated with the activity. The functions of visual collaboration network designer 106 is described in FIG. 2A.

In one example, collaboration network script generator 108 may segregate the automatable process steps into multiple tasks based on parallel executable tasks and sequentially executable tasks. Based on the segregation, different types of distributed computing resources to execute the multiple tasks may be determined. For example, the distributed computing resources may include physical computing resources, virtual computing resources (e.g., virtual machines), or a combination thereof. Further, collaboration network script generator 108 may automatically generate a modified process flow corresponding to the at least one automatable process step based on the segregated multiple tasks and the different types of the distributed computing resources. The generated modified process flow may be referred to as a distributed collaboration network or a collaboration network.

Further, collaboration network script generator 108 may automatically generate a robotic script based on the modified flow of the at least one automatable process step. In one example, collaboration network script generator 108 may determine one or more locations for user interactions to perform the at least one manual process step while executing the robotic script. Furthermore, collaboration network script generator 108 may store the robotic script in the repository (e.g., ERMS 112) and may schedule the execution of the robotic script to perform the activity. The functions of collaboration network script generator 108 is described in FIG. 2B.

During runtime, collaboration network execution engine 110 may execute the robotic script to perform the activity. For example, collaboration network execution engine 110 may retrieve the robotic script from ERMS 112 and/or may obtain the robotic script from collaboration network script generator 108. The robotic scripts may automatically execute the process steps to perform the activity associated with the applications. The functions of collaboration network execution engine 110 is described in FIG. 2C.

In one example, using virtualization and distribution of load (e.g., tasks), it is possible to break the process steps into multiple tasks or chunks. Different tasks can be handled by a combination of users (e.g., agents) and robotic scripts. Further, collaboration network system 100 may allow a back-office transaction to be broken up into multiple tasks of transactions with multiple users and agents working on a task (e.g., virtual or real). Distributed robotic scripts may allow for a smooth handover between agents and bots to complete the activity. Thus, collaboration network system 100 may provide organizations greater flexibility to re-engineer a process, divide it into tasks and assign it to the users or bots.

Examples described herein may automatically determine tasks associated with the processes based on process flow parameters such as inter-dependence, execution sequence, manual vs automatable portion, number of users involved, nature of users involved, already distributed portions of the process, and the like. Also, examples described herein provide a system to design and deploy distributed processes (e.g., either fully automated or semi-automated), which can be used by non-technical users. Further, with collaboration network system 100, users' working hours may be reduced as the amount of labour time used to arrive at a set goal can be reduced by the robotic scripts, user-generated errors may be reduced, operational stability may be improved, customer consistency may be enhanced and so on.

In some examples, the functionalities described herein, in relation to instructions to implement functions of visual collaboration network designer 106, collaboration network script generator 108, collaboration network execution engine 110, and any additional instructions described herein in relation to the storage medium, may be implemented as engines or modules comprising any combination of hardware and programming to implement the functionalities of the modules or engines described herein. The functions of visual collaboration network designer 106, collaboration network script generator 108, and collaboration network execution engine 110 may also be implemented by a respective processor. In examples described herein, the processor may include, for example, one processor or multiple processors.

Figure 2A:
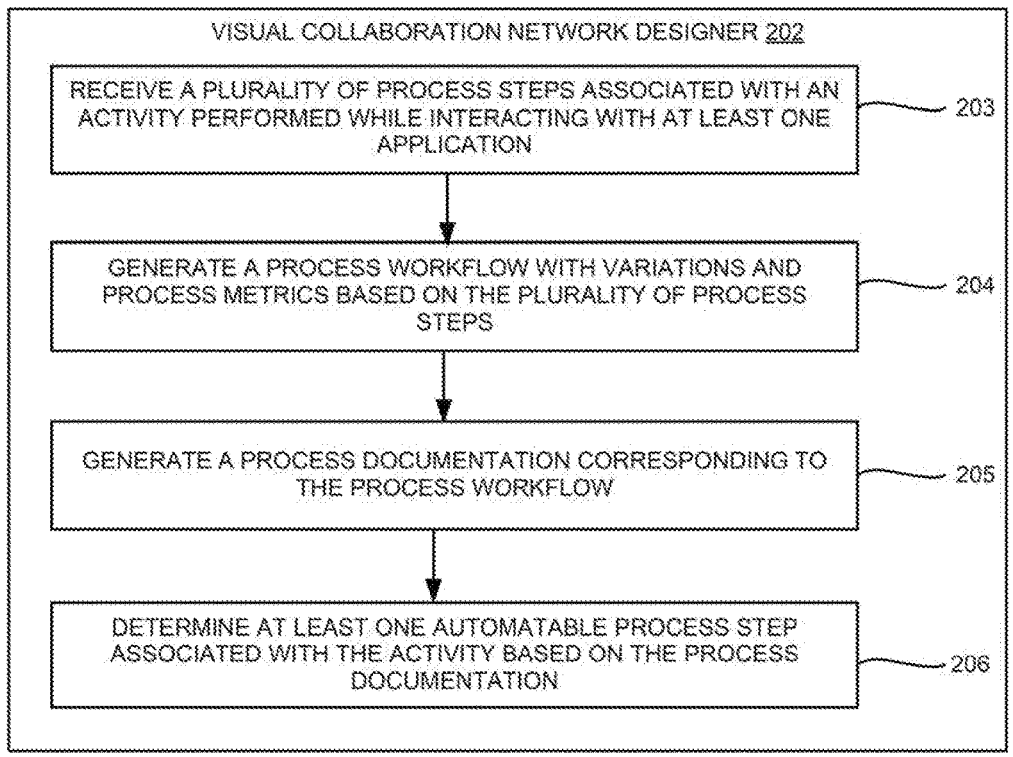
FIG. 2A is a flow diagram of an example visual collaboration network designer illustrating input analysis phase of robotic script generation.

FIG. 2A is a flow diagram of an example visual collaboration network designer 202 (e.g., collaboration network script generator 108 of FIG. 1) illustrating input analysis phase of robotic script generation. At 203, during input analysis phase, process steps associated with an activity performed while interacting with at least one application may be received. In one example, a capture engine of visual collaboration network designer 202 may capture user interactions (e.g., process steps) while executing an application. The captured process steps may relate to user actions performed in a graphical user interface to execute the activity in the application. Further, based on the captured process steps, a set of process steps for performing the activity may be determined. In other words, a user performing the process on the application may be observed by intercepting the user interactions with the application. As part of the process discovery system, a large number of users may be observed when they are performing processes in real-time.

At 204, a process workflow with variations and process metrics may be generated based on the plurality of process steps. In one example, a process discovery engine of visual collaboration network designer 202 may process captured data from one or more users and generate process workflows. Further, the process discovery engine may generate micro and macro process metrics from the captured data and through integration with other third-party systems such as human resource management (HRM), enterprise resource planning (ERP), and the like. Furthermore, the process discovery engine may act as a simulator to allow making changes to the generated workflow and then regenerate the metrics against the modified workflow. At 205, a process documentation corresponding to the process workflow may be generated. In one example, a content generation engine of visual collaboration network designer may create content of various types and formats for generated process workflow.

Thus, visual collaboration network designer 202 may process a database of the captured data for discovering processes. Further, the database may be further processed to identify optimization parameters (e.g., inter-dependence, execution sequence, manual vs automatable portion, number of users involved, nature of users involved, already distributed portions of the process, and the like).

In another example, visual collaboration network designer 202 may allow process designers or users to redesign processes into distributed processes by graphically laying out process components and linking them. A process component may include constructs such as loops, branches, data and file processing gadgets, software application driving robots, software application data collation robots, custom user interface forms, networking and data exchange components, email components, web service and other application programming interface (API) invoking gadgets, and the like. Further, the process component can be a process step or unit of work that can be completely performed on a single computer (or processing unit or virtual machine). The process step performed on the machine may in-turn involve interacting with other remote/virtual infrastructure which may not affect the definition of single computer.

At 206, at least one automatable process step associated with the activity may be determined. In one example, depending on the nature of the process, nature of the applications involved, and nature of the input processing that needs to be performed the extent of automation that can be achieved may vary. Some processes may be fully automatable while others are partially automatable. For example, some process steps of the activity may be executed manually and others by virtual robots. Visual collaboration network designer 202 may determine an extent of automation by determining automatable process steps and manual process steps. Partially automated process components may contain some form of user interface that the user may have to interact with or a position in the robotic script where the execution is paused, and the user is expected to perform a specific task or verify the results of a robot performed action. Further, the process may be re-engineered to determine if user interaction can be done upfront or at once.

Figure 2B:
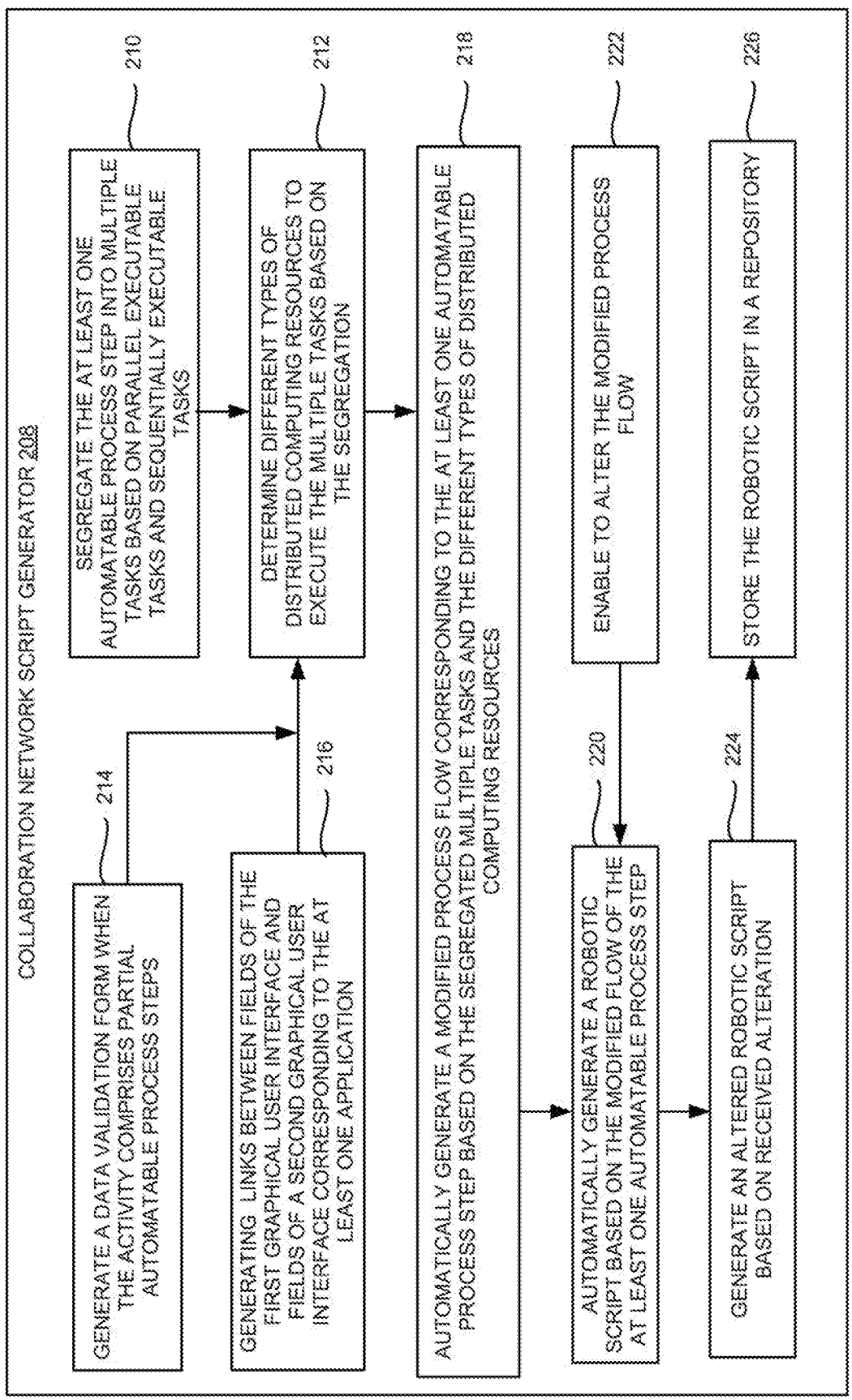
FIG. 2B is a flow diagram of an example collaboration network script generator illustrating automatic process re-engineering phase of robotic script generation.

FIG. 2B is a flow diagram of an example collaboration network script generator 208 (e.g., collaboration network script generator 108 of FIG. 1) illustrating automatic process re-engineering phase of robotic script generation. At 210, automatable process steps are segregated into multiple tasks based on parallel executable tasks and sequentially executable tasks. In one example, the process steps as determined by visual collaboration network designer 202 may be segregated into tasks based on whether the tasks can be run in parallel (e.g., simultaneously) or in-sequence (e.g., one after the other). Further, the nature of the task may assist in deciding whether the tasks are to be run in parallel or in-sequence. The segregated tasks may be referred to as a collaboration network. The collaboration network depicts a communication pattern between different tasks. Further, the collaboration network may not be required to have a single start and single end process. Instead, there could be multiple paths. The path taken could be decided at runtime based on parameters such as available computing resources and the like. The collaboration network is described with examples in FIGS. 3A and 3B.

In one example, collaboration network script generator 208 may include a collaboration network editor to provide a container for running the tasks in parallel. The container may have multiple branches (e.g., paths) and the tasks in each path may run in parallel on an assigned computing resource. Further, the tasks wired one after the other in the collaboration network editor may be considered as sequential tasks.

At 212, different types of distributed computing resources may be determined to execute the multiple tasks based on the segregation. In one example, each task or process component can be assigned a computing resource (e.g., a physical machine) or a role. For example, specific computing resource may be assigned to execute the tasks in case of small organizations with limited number of automated tasks, where the transaction volumes are not significantly more. However, in larger deployments, instead of assigning specific computing resources to execute the tasks, a role may be assigned. At runtime, the computing resources may be selected based on the assigned roles and accordingly assign the tasks to the computing resources.

At 214, a data validation form may be generated when the activity includes partial automatable process steps. In one example, the partially automated process steps can be included anywhere in the overall process flow as determined by collaboration network designer 202. For example, the partially automated process steps can be either at the start or in-between or at the end of the process flow. Further, the partially automated processes may be run on a computing resource such as a desktop machine. For the purpose of allocation of partially automated processes, a computing resource may be assigned, or a role may be defined, at 212. During runtime, the computing resource may be assigned that can perform the defined role.

In one example, when the activity includes interaction with multiple applications, the user may have to enter or provide input data through graphical user interfaces associated with the multiple applications. Entering input through the multiple graphical user interfaces may be repetitive. Therefore, collaboration network script generator 208 may provide an alternative graphical user interface to receive input data corresponding to the graphical user interfaces associated with the multiple applications. In one example, a first graphical user interface (e.g., the alternative graphical interface) may be provided to receive input data corresponding to the activity performed while interacting with the at least one application. At 216, one or more links between fields of the first graphical user interface and fields of a second graphical user interface corresponding to the at least one application may be generated. Further, the computing resource may be assigned, or a role may be defined for executing the activity including interaction with multiple applications, at 212.

At 218, a modified process flow corresponding to the at least one automatable process step may be automatically generated based on the segregated multiple tasks and the different types of the distributed computing resources. For example, the modified process flow may be generated based on the collaboration networks of steps at 210, 214, and 216 with determined computing resources at 212. Further, a robotic script may be automatically generated based on the modified flow of the at least one automatable process step, at 220. Thus, visually represented collaboration network may be converted into programming language scripts (i.e., robotic scripts) that can then be executed in a robot farm and a robot controller may run the robotic scripts. Example robot farm is described in FIG. 5.

At 222, the modified process flow may be enabled for alteration. For example, an agent or an analyst may edit the modified process flow. Further, an altered robotic script may be generated based on received alteration, at 224. At 226, the generated robotic script may be stored in a repository (e.g., ERMS 112 of FIG. 1), which can be scheduled for the execution to perform the activity.

Figure 2C:
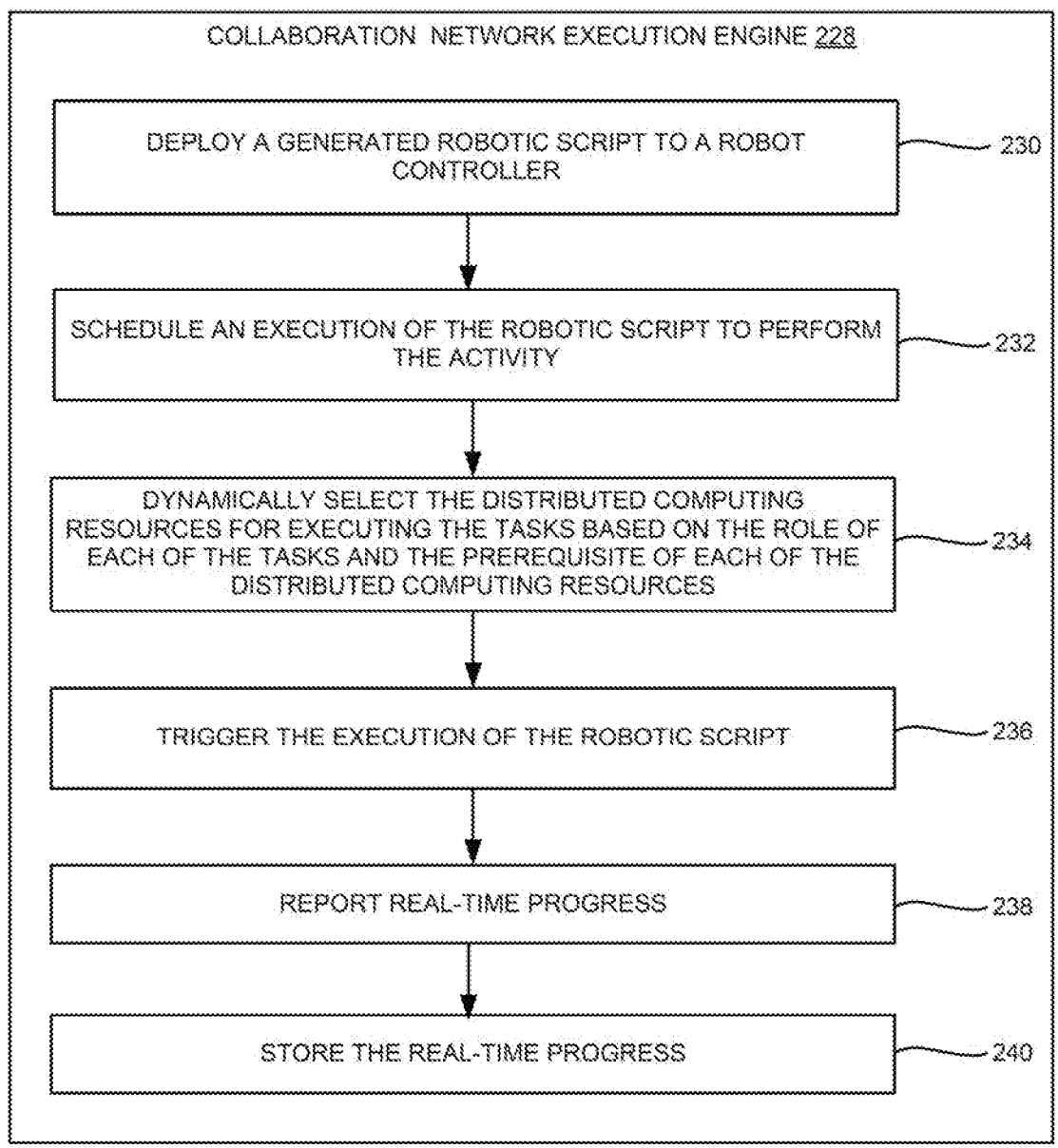
FIG. 2C is a flow diagram of an example collaboration network execution engine illustrating process execution phase.

FIG. 2C is a flow diagram of an example collaboration network execution engine 228 (e.g., collaboration network execution engine 110 of FIG. 1) illustrating process execution phase. At 230, a generated robotic script may be deployed to a robot controller for execution. The robot controller is described in FIG. 5. At 232, an execution of the robotic script may be scheduled to perform the activity. At 234, distributed computing resources may be dynamically selected for executing the tasks based on the role of each of the tasks. For example, as described in step 212 of FIG. 2B, when the role of the tasks is assigned by collaboration network script generator 208, the distributed computing resources may be selected to perform the role and assign the task to the selected distributed computing resources.

At 236, the execution of the robotic script may be triggered. At 238, real-time progress of the execution may be reported. For example, the real-time process of the execution may be reported through a dashboard. The dashboard may give insight into the operational metrics of the collaboration networks. The operational metrics may include a list of running collaboration network instances and current status, and a drill down of the running collaboration network instances with details on each stage of the collaboration network, where it was run, when it was started and when it ended, path taken in the collaboration network, and the like. The dashboard may include the collaboration network instances that are currently in error state, the collaboration network instances that have taken longer time than a predefined time, the collaboration network instances that completed sooner than the predefined time, and a number of computing resources currently idle and available to execute the tasks. Further, execution metrics are also available for previously run instances of the collaboration network.

In one example, the dashboard may include semi-automated or partial automated process metrics with details on the manual tasks like time taken by the user, number of steps performed, idle time, number of errors, number of repetitions, and the like. Also, the dashboard may include business efficiency metrics such as a number of processes targeted, a number of processes completed, preparedness to reach current targets, and the like.

In one example, the dashboard may be configured to provide information relevant to the logged-in user. Further, the dashboard may be made accessible to managers or administrator, and agents who are performing the business process. When the agent is interacting with the dashboard, they would have access to the transactions that they are performing. Also, the agents can monitor progress of the currently running transactions or historical transaction either at a high level or at a granular (e.g., individual step of robotic script) level. Further, the real-time progress may be stored, at 240. Further, the user may use these results such as remote task success, remote task failure, any one task success in a parallel task group, all tasks success in the parallel task group, combination of success and failure results, and the like to plan the subsequent path of execution.

Examples described herein may provide a "TO BE process" for "AS IS process". In one example, "AS IS process" may be documented by deploying the capture engine in agents performing the process over a period of time. For example, the period may be chosen so that significant coverage for the process variations can be obtained. Further, a workflow with the process variations may be extracted. Example workflow may depict branches, manual steps, system interacted steps, and the like. Thus, the spread of variations (e.g., number of transactions, transactions per variation, and the like) may be shown. In one example, different parameters (e.g., Turnaround time (TAT) and the like) may be determined.

For example, the parameter for analysis may be process variation, user category (e.g., can be done in the basis of tenure of the agent, location, and the like), day of week, time of day, and the like. In one example, micrometrics may refer to the metric for a specific individual (e.g., TAT, error rate, and the like). Aggregated micro metrics may refer to the consolidation of the micro metric across a group. Aggregated micro metric may include average TAT, average error, standard deviation, distribution across the group, and the like. Further, the macro metric may refer to the metrics which may not be classified at the individual level but across a group or the entire process and the macro metric may include parameters such as queue length, average queue waiting time, and the like. Further, the macro metric can be mapped to the micro metric in terms of relationships. For example, it can be determined that which micro metric in which group may affect the macro metric and the reason. Further, the micro metric itself may be drilled down to a sub process or a process block and can analyze which block contributes to the maximum error or maximum TAT, and the like.

In one example, the "TO BE process" may be designed. The "TO BE process" may be an amalgamation of "change process blocks or improve the process (i.e., move certain steps), "improve human performance for various steps", "change the underlying application or workflow", "introduce robots" (e.g., attended or unattended for specific variation blocks and running on a single machine or distributed processes running on multiple machines (e.g., physical or virtual machines)).

For example, when robot is performing certain steps, parameters such as timeline, and the like may have to be defined. Further, other parameters can be retained from the "AS IS process". Once the "TO BE process" is defined, a simulation may be performed under real life conditions. Furthermore, queue may be created, specific number of transactions of the queue may be added, rules of distribution to individual agents may be defined, and then simulation may be performed over a simulated period of time. In one example, the performance of the "TO BE process" vs "AS IS process" may be measured to identify bottlenecks in the process and tweak the rules to improve performance. Further, return on investment (ROI) maybe determined for "TO Be process". Thus, a decision may be taken to improve the performance of the activity (e.g., placing the robot to perform a process step, improving human performance, or changing underlying application). Further, the "TO BE process" may be set as a new "AS IS process" and can measure micro metrics and macro metrics for the process. Thus, a new series of process improvements may be achieved.

Figure 3A:
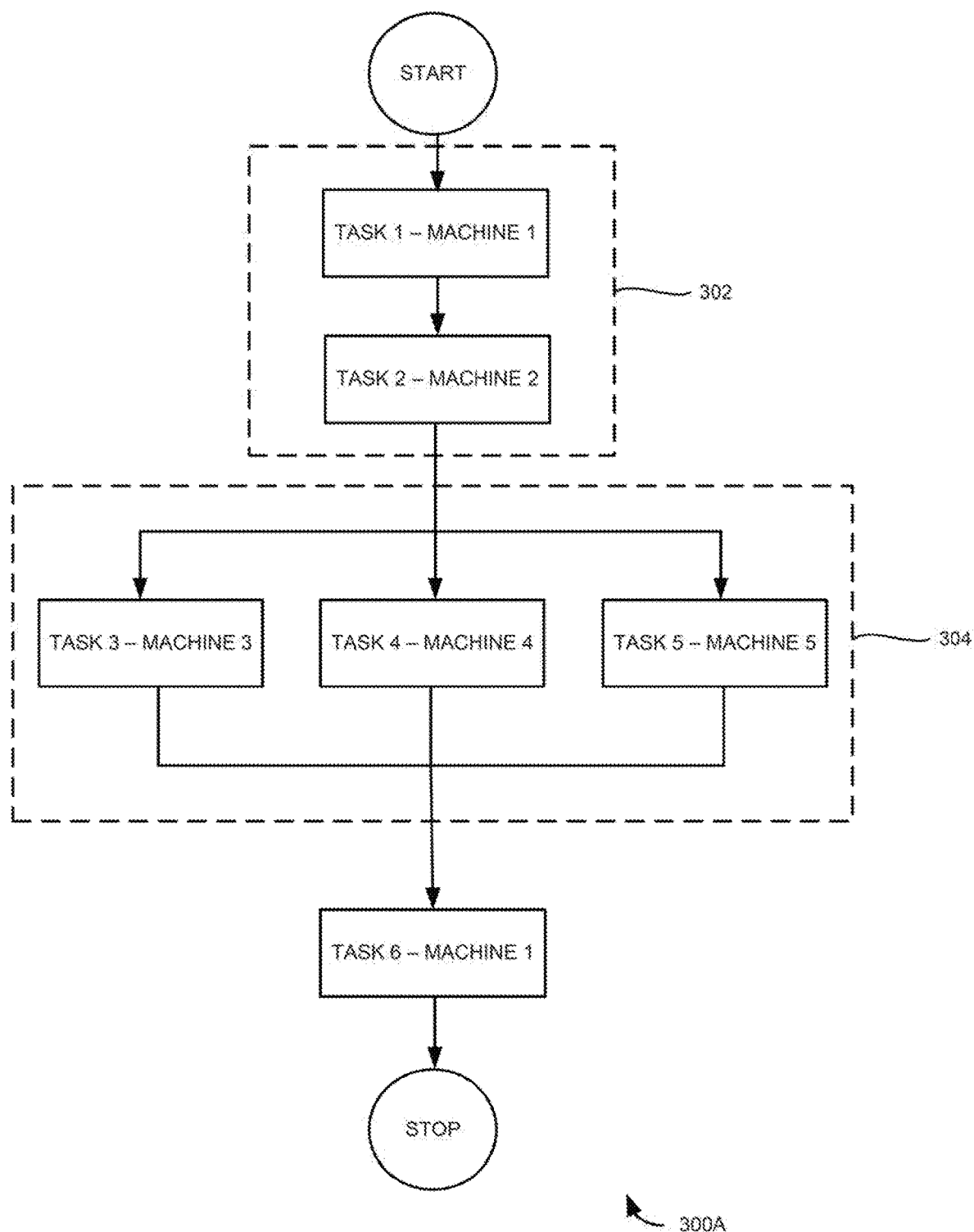
FIG. 3A is an example distributed collaboration network of an activity illustrating parallel and sequential executable tasks.

FIG. 3A is an example distributed collaboration network 300A of an activity illustrating parallel and sequential executable tasks. In one example, process steps associated with the activity may be segregated into multiple tasks based on parallel executable tasks and sequentially executable tasks. As shown in FIG. 3A, collaboration network 300A depicts distributed sequential and parallel tasks with data sharing. For example, the process steps are segregated into tasks 1 to 6. Tasks 1 and 2 may be executed sequentially (e.g., 302). In one example, for sequential executable tasks, a collaboration network execution engine may ensure that a prior task is complete and successful before it invokes the next task. As part of this sequence, the collaboration network execution engine may gather results and shared data from the prior task (e.g., task 1), and hands over to the subsequent task (e.g., task 2). Thereby, the collaboration network execution engine may allow for tasks running on different computing resources to share data. Tasks 3 to 5 may be executed parallelly (e.g., 304). In one example, for parallel executable tasks, the collaboration network execution engine may provide gathered result of a previously executed task (e.g., task 2) and provide to tasks (e.g., tasks 3 to tasks 6) for parallel execution. Further, task 6 may be executed sequentially upon executing parallelly executed tasks.

In one example, captured process steps can be parsed to determine instances of the various tasks that are part of collaboration network 300A. Upon determining the instances of tasks, each task's start and end times can be identified. From the time information and the inter-dependence information, the order in which the tasks are executed can be determined. Accordingly, the execution sequence can be used in the distributed processes. Further, in some processes, there may be a dependence on the order and data associated in one task with that of the other. For example, the dependence when the task is being performed by the user is on the clipboard used for copying and pasting data. Another aspect is the data value of certain key fields being same between the tasks. This kind of dependence can be detected by parsing the process steps. Different tasks containing same key fields and values may be considered to be dependent, for instance.

In one example, different types of the distributed computing resources may be determined to execute the multiple tasks based on the segregated tasks. As shown in FIG. 3A, specific distributed computing resources (e.g., machines 1 to 5) are assigned to tasks 1 to 6.

Figure 3B:
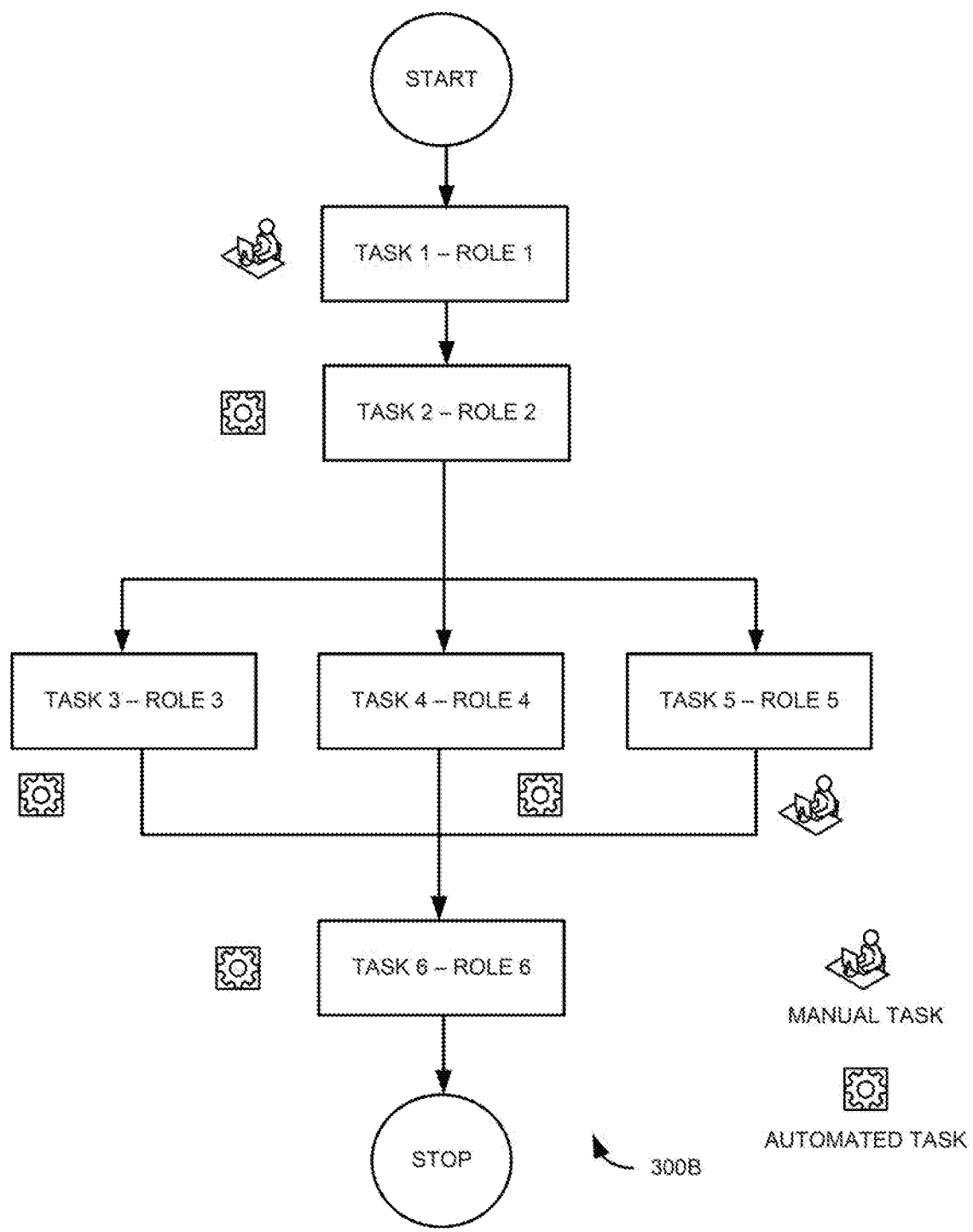
FIG. 3B is an example distributed collaboration network of an activity illustrating automatable tasks and manual tasks.

FIG. 3B is example distributed collaboration network 300B of an activity illustrating automatable tasks and manual tasks. As shown in FIG. 3B, collaboration network 300B depicts distributed sequential (e.g., tasks 1 and 2) and parallel tasks (e.g., tasks 3 to 5) with data sharing. Further, collaboration network 300B depicts manual tasks (e.g., tasks 1 and 5) and automatic tasks (tasks 2, 3, 4, and 6). In one example, specific computing resources are not assigned to tasks as in FIG. 3A. Instead, depending on the role (e.g., roles 1 to 6 corresponding to the tasks 1 to 6) of the task and the type of task (e.g., manual or automated) the computing resources are chosen or selected dynamically at runtime.

In one example, collaboration network 300B may be parsed to look for any usage of performance enhancement or data validation forms which are user interface components that are interacted by the users. Presence of pause points in the robotic script may also signify that an activity may not be completely automated and may involve manual steps. This can then be used to flag the process steps as manual or automated. Presence of a single manual process step in collaboration network 300B may make collaboration network 300B semi-automated. Further, for each of the tasks, the users who performed may be available in a database. For example, the user's role may be retrieved from a human resource database to identify the role of the task. Based on the role of the task, specific computing resource may be assigned at runtime.

Figure 4A:
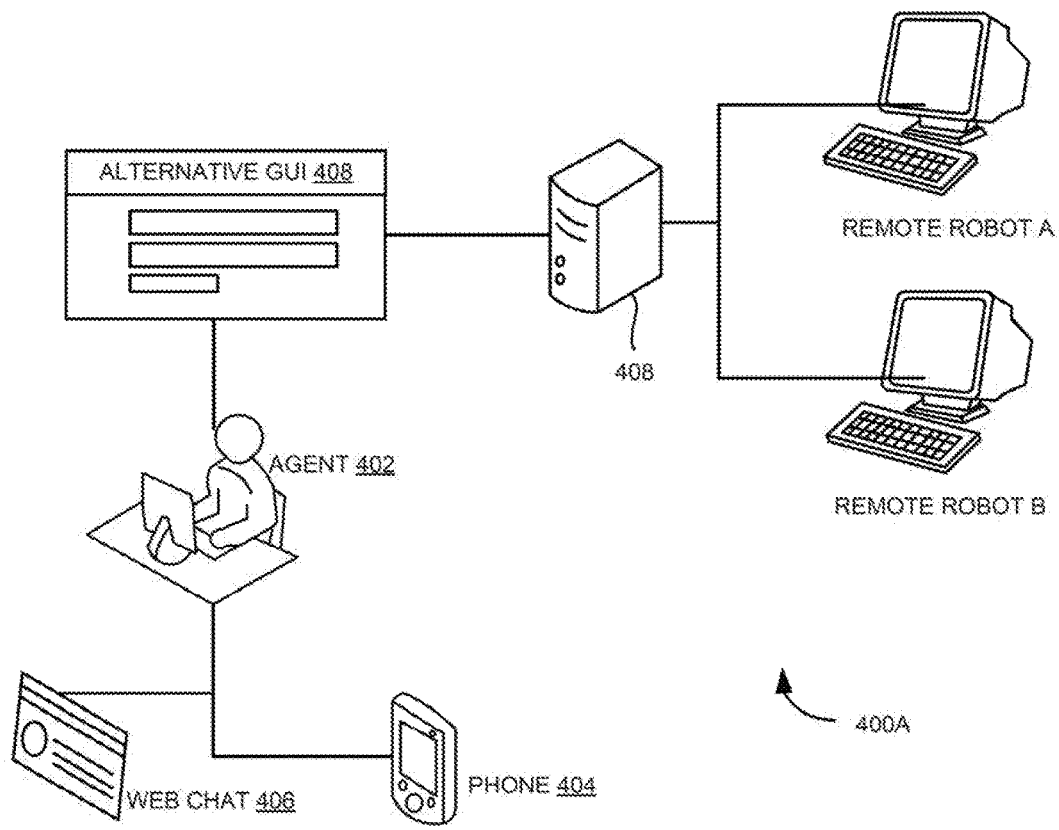
FIG. 4A is an example environment illustrating a use case for a collaboration network engine.

FIG. 4A is an example environment 400A illustrating a use case for a collaboration network engine. The use case may be a call center, where an agent 402 receives a query via a phone call (e.g., 404) or Web chat (e.g., 406) from a customer. Further, agent 402 may enter credentials (e.g., customer identifier (ID)) given by the customer in an application. The application may retrieve other details of the customer and their relationship based on the entered credential like customer ID. The other details could be customer's postal address, phone number, date of birth, nature of relationship, and the like. Agent 402 may read the details and may ask the customer to verify the details to validate that a genuine customer is interacting. Subsequently, the agent may ask the customer for the purpose of call. This may result in agent 402 entering further data into multiple applications (e.g., target applications) and the process could be iterative. Also, agent 402 may have to interact with multiple applications.

Further, due to the nature of business growth through mergers and acquisitions it may be the case that there are diverse applications that require duplication of data (e.g., entering of same information in multiple applications). All these take time and affect the quality of customer interaction and also productivity of agent 402. Also, robotic process automation systems may have the ability to perform tasks in the background on agent's 402 desktop while agent 402 is interacting with other application. However, most of the time the applications may not reside on agent 402 desktop and instead may reside on remote or virtual infrastructure. The call centers or their client may not be willing to deploy the robotic process automation systems on server/remote/virtual infrastructure. In such a situation, the background execution of tasks by the robotic process automation systems may not be possible.

In one example, a distributed robotic process automation collaboration network system (e.g., collaboration network system 100 of FIG. 1) may provide a solution through robotic process automation. The collaboration network system may split process steps into agent related process steps (e.g., manual process steps) and robot related process steps (e.g., automatable process steps). Further, agent 402 may be provided with an alternative graphical user interface 412 by the collaboration network system where agent 402 enters/provides the necessary data only once (e.g., irrespective of how many applications require that same piece of data). Further, robotic script generated by the collaboration network system may hand over the data to one or more remote machines (e.g., remote robot 410A and remote robot 410B) which then perform the tasks of data entry, data retrieval, and the like either simultaneously or one after the other (e.g., based on the process requirement) and then returns the results back to agent 402 which is then displayed back to the customer in the same/similar interface as the data validation form. In one example, a robot controller 408 may control the execution of tasks in remote robot 410A and remote robot 410B. Thus, simplifies agent 402 interaction and also allows them to work on other tasks while the robotic script is busy performing the task on other machines. Further, the applicability of the solution provided by the collaboration network system may not be restricted to voice-based processes. The solution can be applied to any process where distributed robots that run simultaneously or one after the other can bring in productivity improvements and also improve quality of the process deliverables.

Figure 4B:
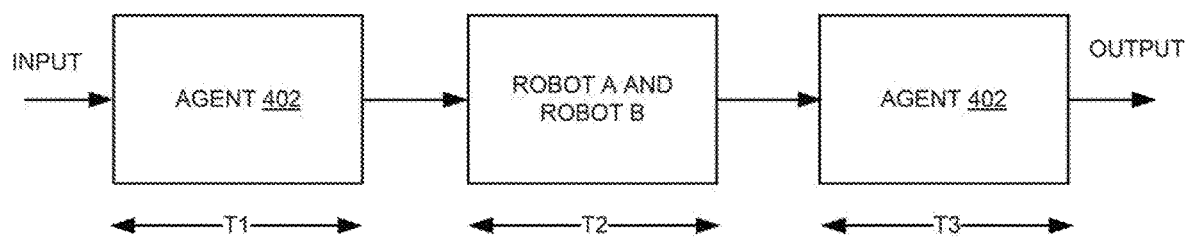
FIG. 4B is a block diagram illustrating an example execution of a robotic script corresponding to the use case of FIG. 4A.

FIG. 4B is a block diagram illustrating an example execution of a robotic script corresponding to the use case of FIG. 4A. Upon receiving a query, agent 402 may enter the data in alternative graphical user interface 412, which in turn corresponding robotic script may be executed. In the example, two robots (e.g., remote robot 410A and remote robot 410B) may be used to execute the query. After the robots (e.g., remote robot 410A and remote robot 410B) complete execution of tasks, result may be passed agent 402 to complete the remaining part of the activity.

For example, consider the time taken for each part of the activity is T1, T2 and T3 as shown in FIG. 4B. The total number of robots required to ensure no bottleneck would be T2/T1. Further, the number of agents required to complete the output part of the activity would be T3/T1. Considering a scenario where the robots (e.g., remote robot 410A and remote robot 410B) takes the same time to complete the interaction with the application as agent 402. In other words, consider that the total time taken by the robots (e.g., remote robot 410A and remote robot 410B) to interact with the application is T2. Specifically, consider that T1=1 min, T2=2 min and T3=1 min. Thus, two robots (e.g., remote robot 410A and remote robot 410B) to interact with the application and one agent may be required to execute the activity. While the transaction time for the process may be same, agent 402 now does just 50% of the activity and is therefore free to take up another activity. The total time per activity of 4 minutes may be reduced to 2.5 minutes, resulting in a saving of about 40%. Thus, distribution of work across diverse virtual and agents may alter the benefits that can be derived from robotic process automation solution.

Figure 5:
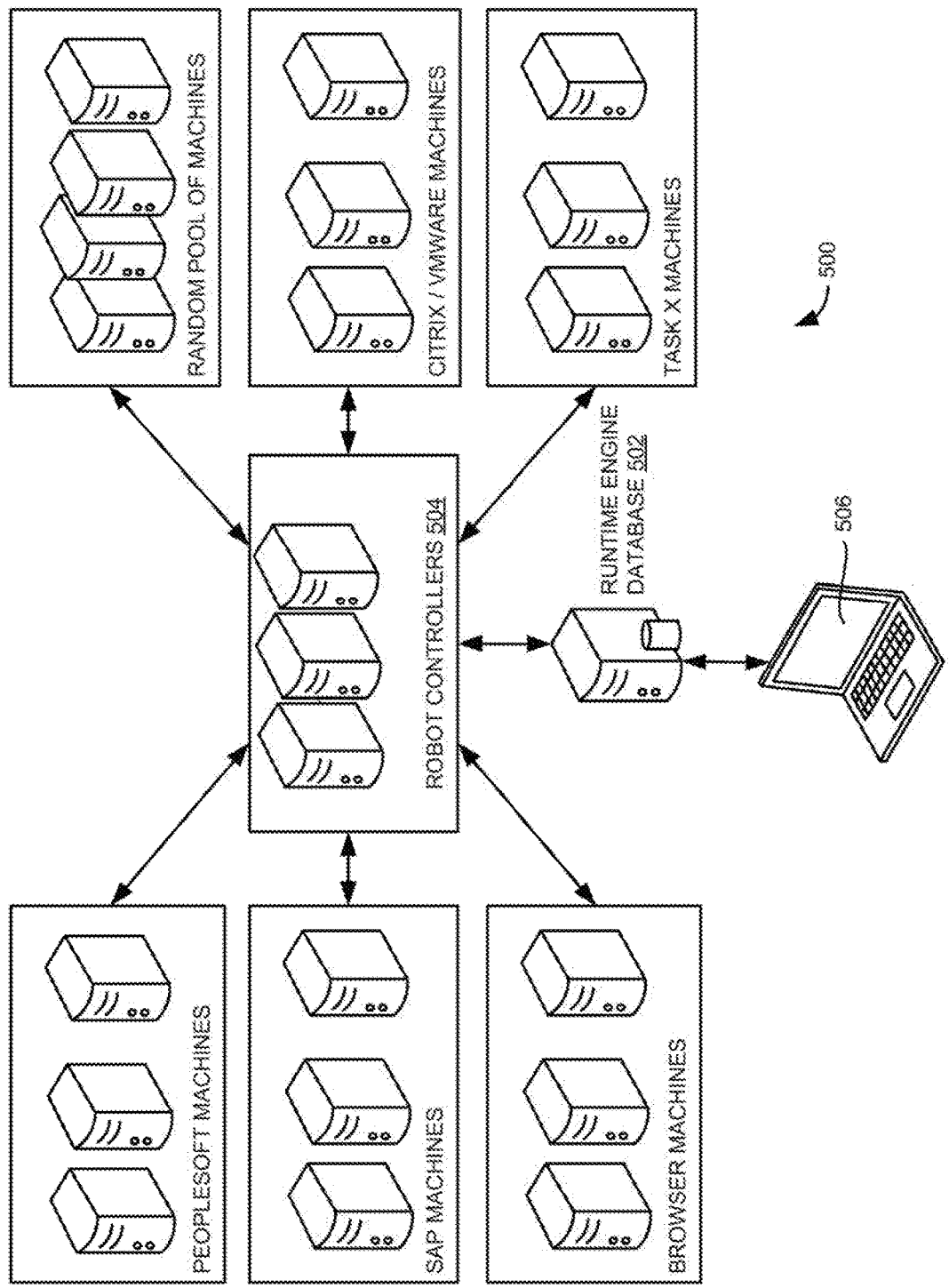
FIG. 5 is a block diagram of an example robot farm.

FIG. 5 is a block diagram of an example robot farm 500. Robot farm 500 may include one or more robot controllers 504 and the pool of machines (e.g., SAP® machines, PeopleSoft® machines, browser machines, and the like) that run individual robots. In one example, the class of machines and the nature of infrastructure used for robot farm 500 may be flexible. For example, desktop, laptops, server class hardware, virtual machines, thin clients, and so on may be used in robot farm 500. Robot farm 500 may not have restriction on the physical geography (e.g., location) and instead can be spread across various locations. Also, an individual agent desktop can also participate in robot farm 500 as a robot machine or the robot controller. Further, robot controller 504 may be in communication with agent machine 506 through workflow or process runtime engine database 502, for instance.

Robot farm 500 design may be dependent on the nature of processes, the technology infrastructure and software operating environment on which the processes are built, the deployment infrastructure, operational needs like geographical distribution, organizational structure, involvement of external agencies like BPO in performing process, and so on. Accordingly, multiple pools of computing resources may be created to perform specific parts of the processes. Further, robot controller 504 may have a registry that enables mapping machine pools with their roles and then making efficient use of them in collaboration network execution.

Robot controller 504 may include a computing resource from a pool of specifically assigned robot controllers 504 whose main purpose is to trigger and manage distributed robots. Robot controller 504 can be any machine (headless/virtual machine/physical desktop) from robot farm 500, can be a machine which is being used by an agent who initiates the robot in the case of semi-automated processes. In one example, robot controller 504 may be responsible for initiating a distributed collaboration network. The initiation step can be either done manually by the agent by choosing a distributed collaboration network and launching it from the user interface or it can be launched at pre-scheduled time or it can be launched as part of configured external triggers or it can be initiated by a third-party process/application with which the distributed collaboration network is integrated. Robot controller 504 may invoke specific robot projects/process scripts on other machines or itself. Robot controller 504 may know the status of each of the machines that are part of robot farm 500. Robot controller 504 may know which machine is participating in which instance of which distributed collaboration network and also current steps being performed by the machine. Robot controller 504 may also know which machine is idle or available for new jobs to be assigned. Robot controller 504 may maintain a registry where machines with specific roles are recorded. The machines may be used to assign specific tasks that are relevant for their role. Processes which are generic in nature can be assigned to machines which are from a generic pool.

Robot farm 500 constituents (e.g., basically machines that are part of robot farm 500 or specific role pools) may change. For example, new machines can register themselves into a pool by specifying their role or into a generic pool. Robot controller 504 may take responsibility for scanning the registry on a regular basis, pinging the machines in the pool and maintaining a health status of the machines. Any machines that are part of robot farm 500 but have not responded for extended periods of time are marked as unavailable for assigning newer jobs. Robot controller 504 may inform the robot to perform the entire script or a specific sub-routine in the script. Robot controller 504 may pass as input to the remotely launched robot, values that are either coded in the script or data that is gathered as part of other portions of the collaboration network. The data could be from other machines that are participating in the distributed collaboration network.

Robot controller 504 may accept values from the remotely launched robot. These output values are then used in other parts of the distributed collaboration network. Robot controller 504 may wait for the execution of the remotely launched robot to complete. Further, robot controller 504 may synchronize the execution of multiple remote robots running in parallel. The robot upon successful execution of a particular remote robot may move on to the next task in the distributed collaboration network. Robot controller 504 may handle errors in execution of the remote robots. Robot controller 504 may either abort or retry any specific remote robot. Robot controller 504 may keep track of the execution status of each of the remote robots. Robot controller 504 may maintain the execution status in a central collaboration network runtime engine database (e.g., 502). The execution metrics may include the start time, end time, specific machine, user credentials used on the machine, the input values received, the output values generated, the final status of the remote Robot on the machine, the various stages of progress of the robot, and so on. Robot controller 504 may use different communication protocols to interact with the remote robot machines. Few examples may include http, https, tcp, web sockets, RMI, and the like. The data exchange can be in the form of JSON, XML, and the like.

The robot may run on a particular machine in robot farm 500. A part of the robot may run even on agent machine 506 and not necessarily always on robot farm 500. In one example, the agent desktop (or virtual infrastructure accessed by the agent) can itself be part of robot farm 500. The robot on agent machine 506 can either participate in the start of the process as the initiating component or it can participate at any stage of the process.

Further, the robot can include an alternative graphical user interface. The alternative graphical user interface may hide the complexity of the individual business process applications and instead let the agent focus on the activity or transaction at hand. Thereby, each robot for each business process or business process transaction can have a custom user interface optimized for that transaction. Further, the alternative graphical user interface can cater to all the needs of the agent and accepts user inputs where it behaves as a data entry and data validation form overcoming all the gaps in validation and error handling of the underlying business software applications. The alternative graphical user interface may gather data from one or more applications or data sources and present it to the agent. The alternative graphical user interface may gather progress information of one or more robot machines and other business systems participating in the transaction for the benefit of the agent.

In one example, shared data in the collaboration network may be decided by the individual robot running on the machine. The robotic script can mark specific data values as shared accordingly the final value of those variables at the end of the robotic script execution on the specific machine is serialized and returned to robot controller 504.

Further, some of the remote robots may due to unknown reasons take unusually long amount of time to complete or may get into endless loop or error situations. In such situations instead of waiting forever and affecting other process instances for getting a chance to execute, the collaboration network would have the ability to timeout and abort/retry the faulty process. The collaboration network editor would have default values for the configurable items. However, the user may have the ability to override them with custom values. The same can further be overridden by the operations team through a dashboard displayed on agent machine 506. Dashboard provides information of capacity utilization of robot farm 500, individual pools of machines and individual machines. Further, dashboard may provide information of categorizing collaboration networks based on success, failure, average time metrics, and the like.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 6:
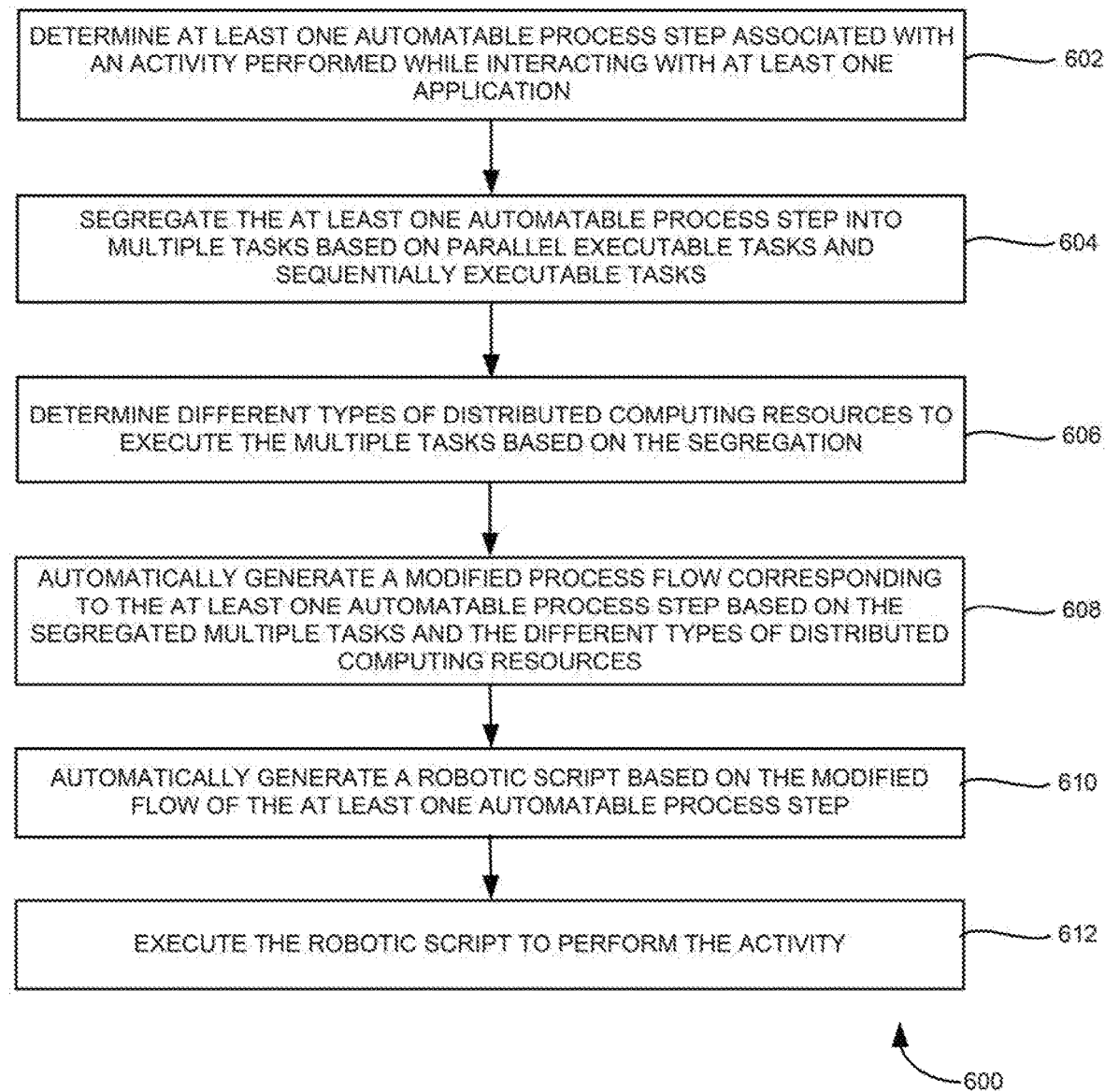
FIG. 6 is an example flow diagram illustrating automatic robotic scripts generation for distributed computing resources.

FIG. 6 is an example flow diagram 600 illustrating automatic robotic scripts generation distributed computing resources. It should be understood that the process depicted in FIG. 6 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 602, at least one automatable process step associated with an activity performed while interacting with at least one application may be determined. At 604, the at least one automatable process step may be segregated into multiple tasks based on parallel executable tasks and sequentially executable tasks.

At 606, different types of distributed computing resources may be determined to execute the multiple tasks based on the segregation. At 608, a modified process flow corresponding to the at least one automatable process step may be automatically generated based on the segregated multiple tasks and the different types of the distributed computing resources.

At 610, a robotic script may be automatically generated based on the modified flow of the at least one automatable process step. In one example, at least one manual process step associated with the activity may be determined. Further, one or more locations for user interactions to perform the at least one manual process step while executing the robotic script may be determined. At 612, the robotic script may be executed to perform the activity.

Figure 7:
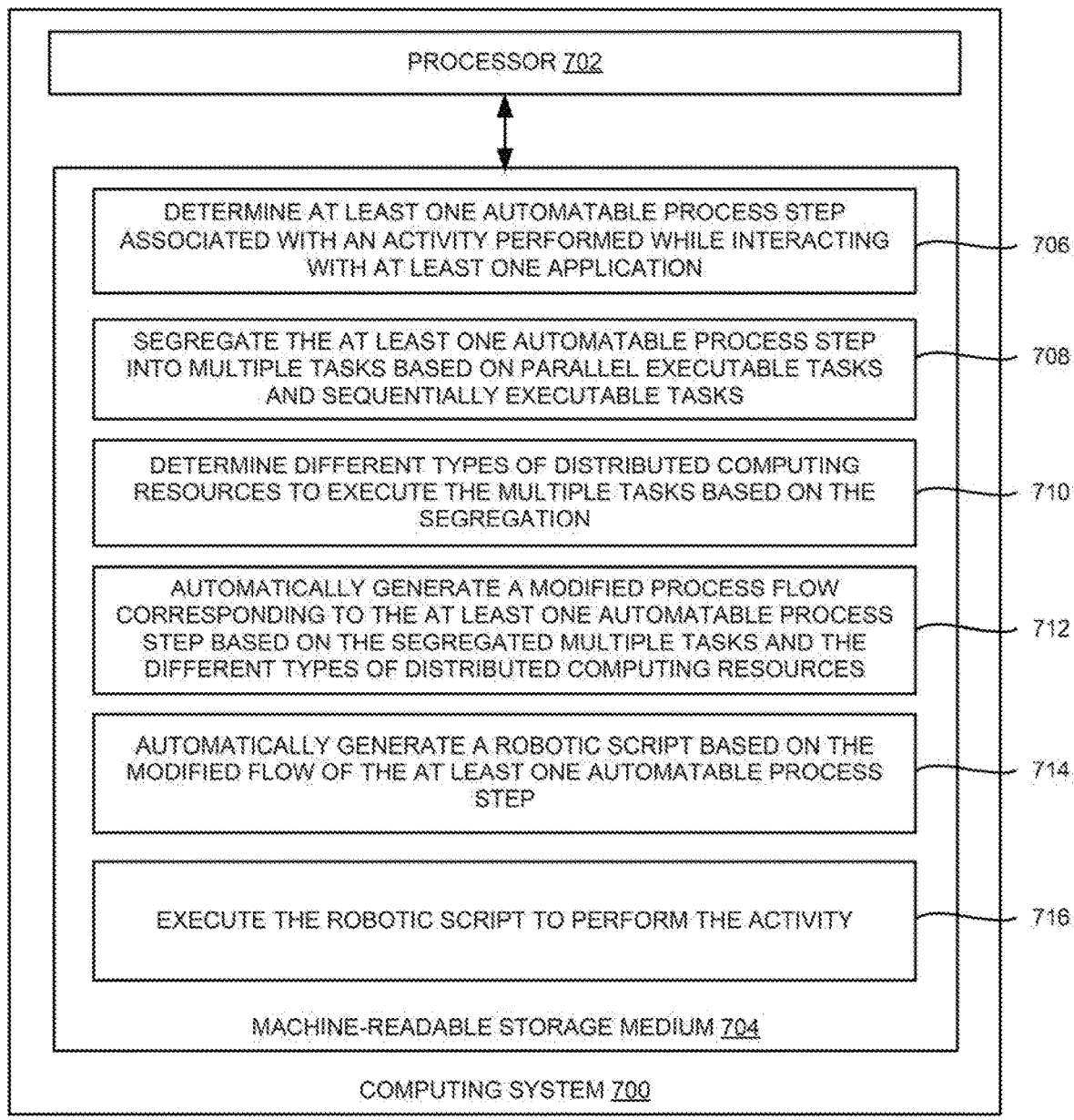
FIG. 7 is a block diagram of an example computing system including non-transitory computer-readable storage medium, storing instructions to provide automatic robotic scripts generation for distributed computing resources.

FIG. 7 is a block diagram of an example computing system 700 (e.g., collaboration network system 100 of FIG. 1) including non-transitory computer-readable storage medium, storing instructions to provide automatic robotic scripts generation for distributed computing resources. Computing system 700 may include a processor 702 and a machine-readable storage medium 704 communicatively coupled through a system bus. Processor 702 may be any type of central processing unit (CPU), microprocessor, or processing logic that interprets and executes machine-readable instructions stored in machine-readable storage medium 704. Machine-readable storage medium 704 may be a random-access memory (RAM) or another type of dynamic storage device that may store information and machine-readable instructions that may be executed by processor 702. For example, machine-readable storage medium 704 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 704 may be a non-transitory machine-readable medium. In an example, machine-readable storage medium 704 may be remote but accessible to computing system 700.

Machine-readable storage medium 704 may store instructions 706-716. In an example, instructions 706-716 may be executed by processor 702 for automatic robotic scripts generation for distributed computing resources. Instructions 706 may be executed by processor 702 to determine at least one automatable process step associated with an activity performed while interacting with at least one application. Instructions 708 may be executed by processor 702 to segregate the at least one automatable process step into multiple tasks based on parallel executable tasks and sequentially executable tasks. Instructions 710 may be executed by processor 702 to determine different types of distributed computing resources to execute the multiple tasks based on the segregation. Instructions 712 may be executed by processor 702 to automatically generate a modified process flow corresponding to the at least one automatable process step based on the segregated multiple tasks and the different types of the distributed computing resources. Instructions 714 may be executed by processor 702 to automatically generate a robotic script based on the modified flow of the at least one automatable process step. Further, instructions 716 may be executed by processor 702 to execute the robotic script to perform the activity.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A processor-implemented method, comprising:

capturing a plurality of process steps performed while interacting with at least one application running on a computing system, wherein the plurality of process steps corresponds to graphical user interface interactions carried out while performing an activity;

determining at least one automatable process step associated with the activity from the plurality of process steps;

segregating the at least one automatable process step into multiple tasks based on parallel executable tasks and sequentially executable tasks, wherein the segregated multiple tasks are to indicate a communication pattern between the parallel executable tasks and the sequentially executable tasks with data sharing:

determining different types of distributed computing resources to execute the multiple tasks based on the segregation, wherein the distributed computing resources executing the parallel executable tasks and the sequentially executable tasks are enabled to share the data;

automatically generating a modified process flow corresponding to the at least one automatable process step based on the segregated multiple tasks and the different types of the distributed computing resources, wherein the modified process flow includes multiple paths between the parallel executable tasks and the sequentially executable tasks with the data sharing, and wherein the parallel executable tasks in different paths can be executed in parallel based on the communication pattern; and generating a software robot to automate a process of performing the activity associated with the at least one application based on the modified process flow of the at least one automatable process step.

2. The method of claim 1, further comprising:
  determining at least one manual process step associated with the activity; and
  determining one or more locations for user interactions to perform the at least one manual process step while executing the software robot.

3. The method of claim 1, wherein the distributed computing resources comprise physical computing resources, virtual computing resources, or a combination thereof.

4. The method of claim 1, wherein determining the different types of the distributed computing resources comprises assigning different types of the distributed computing resources for executing the tasks.

5. The method of claim 1, wherein determining the different types of the distributed computing resources comprises determining a role of each of the tasks.

6. The method of claim 5, further comprising executing the software robot by dynamically selecting the distributed computing resources for executing the tasks based on the role of each of the tasks.

7. The method of claim 1, further comprising:
  providing a first graphical user interface to receive input data corresponding to the activity performed while interacting with the at least one application; and
  generating one or more links between fields of the first graphical user interface and fields of a second graphical user interface corresponding to the at least one application.

8. The method of claim 1, further comprising generating a data validation form when the activity comprises partial automatable process steps.

9. The method of claim 1, further comprising:
  enabling to alter the modified process flow; and
  generating an altered software robot based on received alteration.

10. The method of claim 1, further comprising executing the software robot by:
  storing the software robot in a repository; and
  scheduling execution of the software robot to perform the activity.

11. The method of claim 1, further comprising:
  executing the software robot to automate the process of performing the activity by mimicking the graphical user interface interactions.

12. A computing system comprising:
  at least one processor;
  memory coupled to the at least one processor;
  a visual collaboration network designer in the memory and configured to be executed by the at least one processor, the visual collaboration network designer is to:
    capture a plurality of process steps performed while interacting with at least one application running on the computing system, wherein the plurality of process steps corresponds to graphical user interface interactions carried out while performing an activity;
    generate a process workflow with variations and process metrics based on the plurality of process steps;
    generate a process documentation corresponding to the process workflow; and
    determine at least one automatable process step associated with the activity based on the process documentation;
  a collaboration network script generator in the memory and configured to be executed by the at least one processor, the collaboration network script generator is to:
    segregate the at least one automatable process step into multiple tasks based on parallel executable tasks and sequentially executable tasks, wherein the segregated multiple tasks are to indicate a communication pattern between the parallel executable tasks and the sequentially executable tasks with data sharing;
    determine different types of distributed computing resources to execute the multiple tasks based on the segregation, wherein the distributed computing resources executing the parallel executable tasks and the sequentially executable tasks are enabled to share the data;
    automatically generate a modified process flow corresponding to the at least one automatable process step based on the segregated multiple tasks and the different types of the distributed computing resources, wherein the modified process flow includes multiple paths between the parallel executable tasks and the sequentially executable tasks with the data sharing, and wherein the parallel executable tasks in different paths can be executed in parallel based on the communication pattern; and
    generate a software robot based on the modified process flow of the at least one automatable process step; and
  a collaboration network execution engine in the memory and configured to be executed by the at least one processor, the collaboration network execution engine is to execute the software robot to automate a process of performing the activity associated with the at least one application running on the computing system.

13. The computing system of claim 12, wherein the visual collaboration network designer is to receive the plurality of process steps associated with the activity by observing a user performing the plurality of process steps.

14. The computing system of claim 12, wherein the visual collaboration network designer is to determine at least one manual process step associated with the activity and the collaboration network script generator is to determine one or more locations for user interactions to perform the at least one manual process step while executing the software robot.

15. The computing system of claim 12, wherein the distributed computing resources comprise physical computing resources, virtual computing resources, or a combination thereof.

16. The computing system of claim 12, wherein the collaboration network script generator is to:
  store the software robot in a repository; and
  schedule the execution of the software robot to perform the activity.

17. A non-transitory machine-readable storage medium encoded with instructions that, when executed by a processor, cause the processor to:
  capture a plurality of process steps performed while interacting with at least one application running on a computing system, wherein the plurality of process steps corresponds to graphical user interface interactions carried out while performing an activity;
  determine at least one automatable process step associated with the activity from the plurality of process steps;
  segregate the at least one automatable process step into multiple tasks based on parallel executable tasks and sequentially executable tasks, wherein the segregated multiple tasks are to indicate a communication pattern between the parallel executable tasks and the sequentially executable tasks with data sharing;

determine different types of distributed computing resources to execute the multiple tasks based on the segregation, wherein the distributed computing resources executing the parallel executable tasks and the sequentially executable tasks are enabled to share the data;

automatically generate a modified process flow corresponding to the at least one automatable process step based on the segregated multiple tasks and the different types of the distributed computing resources, wherein the modified process flow includes multiple paths between the parallel executable tasks and the sequentially executable tasks with the data sharing, and wherein the parallel executable tasks in different paths can be executed in parallel based on the communication pattern; and generate a software robot to automate a process of performing the activity associated with the at least one application based on the modified process flow of the at least one automatable process step.

18. The non-transitory machine-readable storage medium of claim 17, further comprising instructions that, when executed by the processor, cause the processor to:

determine at least one manual process step associated with the activity; and determine one or more locations for user interactions to perform the at least one manual process step while executing the software robot.

19. The non-transitory machine-readable storage medium of claim 17, wherein the distributed computing resources comprise physical computing resources, virtual computing resources, or a combination thereof.

20. The non-transitory machine-readable storage medium of claim 17, further comprising instructions that, when executed by the processor, cause the processor to:

provide a first graphical user interface to receive input data corresponding to the activity performed while interacting with the at least one application; and generate one or more links between fields of the first graphical user interface and fields of a second graphical user interface corresponding to the at least one application.

21. The non-transitory machine-readable storage medium of claim 17, further comprising instructions to:

execute the software robot by:
storing the software robot in a repository; and
scheduling the execution of the software robot to perform the activity.

22. The non-transitory machine-readable storage medium of claim 17, further comprising instructions that, when executed by the processor, cause the processor to:

executing the software robot to automate the process of performing the activity by mimicking the graphical user interface interactions.

* * * * *